United States Patent [19]
Dillard

[11] Patent Number: 5,194,035
[45] Date of Patent: Mar. 16, 1993

[54] AUTOMATIC POULTRY PROCESSOR AND METHOD

[75] Inventor: Kenneth D. Dillard, Canton, Ga.

[73] Assignee: MEYN USA, Inc., Gainesville, Ga.

[21] Appl. No.: 822,962

[22] Filed: Jan. 17, 1992

[51] Int. Cl.[5] .......................................... A22C 21/00
[52] U.S. Cl. .................................. 452/165; 452/149;
452/160; 452/183
[58] Field of Search ............... 452/149, 151, 160, 165,
452/183, 167

[56] References Cited

U.S. PATENT DOCUMENTS

| | | | |
|---|---|---|---|
| 3,570,050 | 3/1971 | Draper et al. | 17/46 |
| 4,016,624 | 4/1977 | Martin et al. | 17/11 |
| 4,019,223 | 4/1977 | Baker | 17/11 |
| 4,385,419 | 5/1983 | Cantrell | 452/165 |
| 4,385,421 | 5/1983 | Martin | 17/52 |
| 4,424,608 | 1/1984 | Martin | 17/52 |
| 4,477,942 | 10/1984 | Martin et al. | 17/11 |
| 4,564,976 | 1/1986 | Beech et al. | 17/11 |
| 4,780,930 | 11/1988 | Sparkia | 17/11 |
| 4,937,918 | 7/1990 | Martin | 452/165 |
| 4,993,111 | 2/1991 | Martin et al. | 452/169 |
| 5,035,673 | 7/1991 | Hazenbroek | 452/149 |
| 5,045,022 | 9/1991 | Hazenbroek | 452/165 |

FOREIGN PATENT DOCUMENTS 2129278 5/1984 United Kingdom ................ 452/165

Primary Examiner—Willis Little
Attorney, Agent, or Firm—Dority & Manning

[57] ABSTRACT

Automatic poultry processor and corresponding methodology permits poultry to be directly received from a conventional overhead track, without manual intervention. Spring loaded leg drags temporarily impede movement of a bird relative an overhead track, during which time a loading cone is inserted into the body cavity of the bird. The loading cone is driven by a continuous loop conveyor for positively driving the breast half of the bird as the hind quarters are positively directed by the overhead track, whereby the bird is directed towards a knife for separating the hind quarters from the breast half. Thereafter, the hind quarters are carried away by the overhead track, while the loading cone may be used to drive the breast half towards further processing steps, such as automatic halving and automatic deboning. The continuous conveyor supporting the loading cone has a double curvature in the vicinity of the conveyor flow where birds are loaded. The double curvature helps guide the tip of the loading cone into the body cavity and then helps thrust it deeper into the cavity so as to be fully seated.

40 Claims, 7 Drawing Sheets

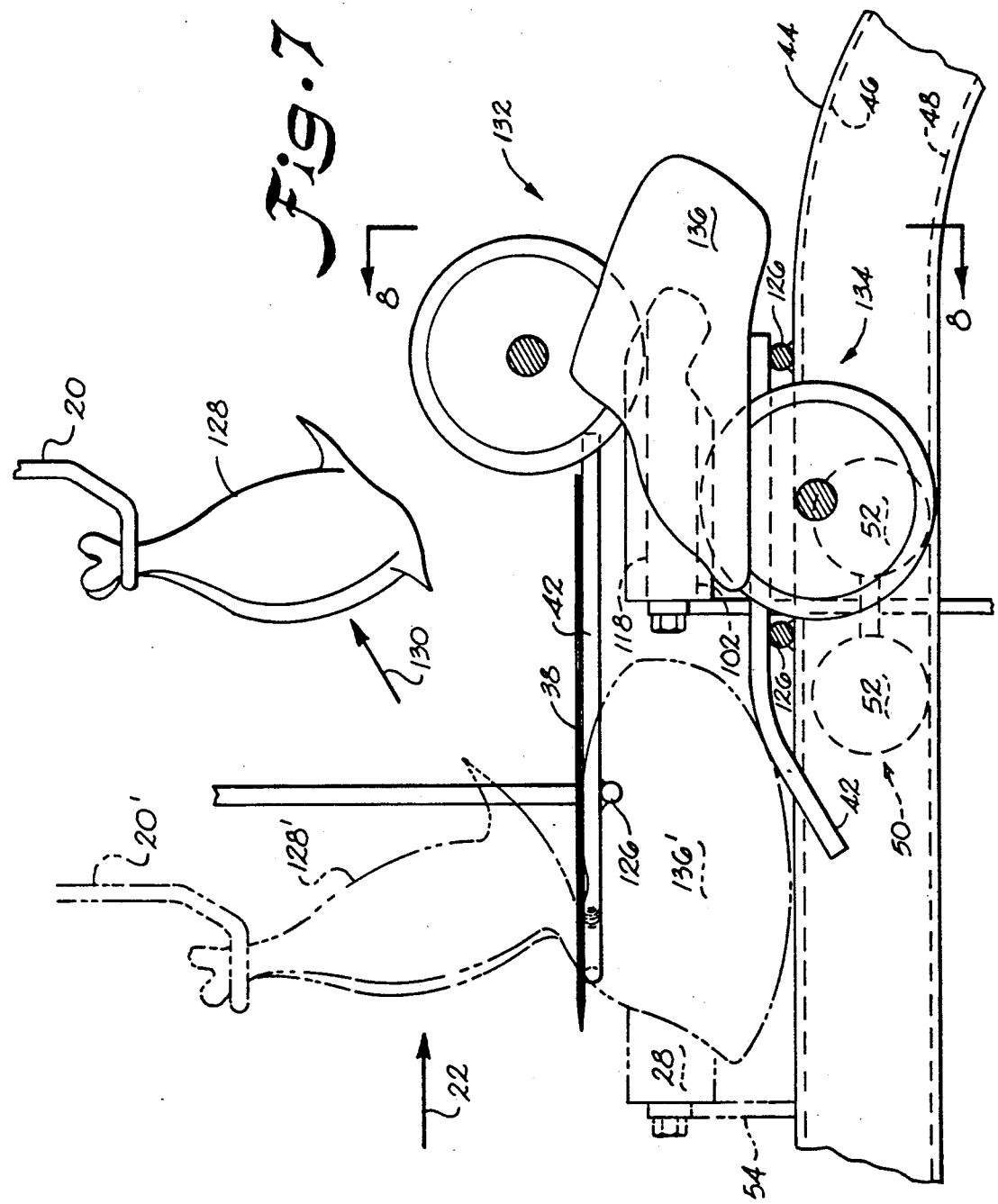

5,194,035

AUTOMATIC POULTRY PROCESSOR AND METHOD

BACKGROUND OF THE INVENTION

The present invention concerns poultry processing in general, and more particularly concerns automatic poultry processing apparatus and corresponding methodology for improved handling of poultry during processing and without requiring manual intervention.

The poultry industry (for example, chickens, turkeys, and the like) is a major industry worldwide, involving the processing of a large volume of birds annually As such, the industry relies heavily on a line processing approach, in which a bird is moved along from station to station in a processing line. Frequently, a bird in various intermediate stages of being processed must be moved from one location to another, or from one type of machine to another. Various track arrangements have been utilized for such purposes.

One conventional such form of transport involves a moving track or conveyor type arrangement, often located overhead, from which poultry is variously suspended. One major phase of poultry processing involves the cleaning and preparation of the bird so as to obtain a dressed carcass, and another major phase involves processing of the dressed bird. Often, such processing involves a cut-up line or other processing in which the dressed bird is variously sectioned as desired into different usable pieces. Of course, the exact processing which is undertaken depends on the desired utilization of the poultry meat.

Frequently, birds emerge from the first major phase (i.e., being dressed or fully cleaned for subsequent processing) on an overhead track arrangement. One such conventional overhead track has leg hooks by which dressed birds are hung in an inverted position and advanced at predetermined spacing intervals. One example of such overhead track is disclosed in Hazenbroek (U.S. Pat. No. 5,035,673), the disclosure of which is fully incorporated herein by reference.

Generally speaking, dressed birds received in such an overhead track must either be transferred to a further poultry processing machine (often times involving manual intervention) or must otherwise be treated while still secured to and advanced by the conventional overhead track. In general, there are disadvantages with either approach, as follows.

Manual intervention can prove to be slow, tedious work which not only might subject birds to variations in treatment, but also poses health risks and problems with respect to the handling of food during its preparation. With respect to machines which more directly process a bird without removing it from an overhead track, any inadequacies in support or positive drive force for the bird or other variations (such as different bird sizes) can cause misalignment of the bird during the cutting process. Such misalignment can cause wasted pieces and, if the misalignment is serious enough, the processing line may become jammed or some other event may require manual intervention in the processing line. Of course, all such events are highly undesired for any type of processing line which is intended to run continuously.

Another aspect of poultry processing machines is another health related issue. In general, the more machine parts (i.e., greater complexity) involved, the greater the number of surfaces and areas in which harmful bacteria or the like may become lodged and grow. Accordingly, simplicity and the ability to service cleaning of an apparatus are important considerations for poultry processing equipment and methodologies.

SUMMARY OF THE INVENTION

The present invention recognizes and addresses various of the foregoing problems, and others, concerning poultry processing operations. Thus, broadly speaking, a principal object of this invention is improved poultry processing operations. More particularly, a main concern is improved automatic apparatus and methodology for automatically receiving and handling dressed birds.

It is another more particular object of the present invention to provide improved apparatus and methodology which is capable of automatically receiving and handling dressed birds delivered thereto by a conventional overhead track, such as having leg hooks by which dressed birds are hung in an inverted position and advanced at predetermined spacing intervals. It is a more specific object to provide such improvements which particularly provide for improved positive drive to a bird carcass as it is advanced through processing steps. Accordingly, it is a further object to minimize the mishandling of bird carcasses which can result in the misalignment of processing cuts thereto, or jamming or similar problems of pieces in a poultry processing line as can occur when unsecured carcasses or poultry pieces become dislodged or otherwise fall in and around poultry processing equipment.

It is another general object of the present invention to provide apparatus and methodology which achieves its stated objects with a relative simplicity of parts and movement, so as to minimize potential adverse health consequences associated with numerous and/or difficult to clean surfaces.

It is another general object of the present invention to provide improved apparatus and methodology which improves safety and health concerns (for workers and consumers) by minimizing the need for manual intervention during normal processing operations.

It is another present object to provide for improved automatic handling of dressed poultry, regardless of whether such poultry will be subsequently treated to automatic halving and deboning. In other words, it is a present object to provide for improved automatic handling of poultry regardless of the specific processing steps (i.e., cutting operations) which will be subsequently undertaken in a given instance. In keeping with such object, it is one object to provide apparatus and methodology which particularly permits efficient interface with birds being carried in a conventional overhead track for automatically handling and processing such birds so as to separate the hind quarters from the breast half thereof, with subsequent processing of such breast half varying in different circumstances.

Additional objects and advantages of the invention are set forth in, or will be apparent to those of ordinary skill in the art from, the Detailed Description which follows. Also, it should be further appreciated that modifications and variations to the specifically illustrated and discussed features and steps hereof may be practiced in various embodiments and uses of this invention without departing from the spirit and scope thereof, by virtue of present reference thereto. Such variations may includes, but are not limited to, substitution of equivalent means and features, materials, or steps, for those shown or discussed, and the functional or positional reversal of various parts, features, steps, or the like.

Still further, it is to be understood that different embodiments, as well as different presently preferred embodiments, of this invention may include various combinations or configurations of presently disclosed features or steps, or their equivalents (including combinations thereof or configurations of features or steps not expressly shown in the FIGURES or stated in the Detailed Description). One exemplary such embodiment of the present invention relates to an improved automatic poultry processing apparatus. Such apparatus preferably includes carriage means, poultry engagement means, and loading means. The carriage means are for advancing poultry through the apparatus for processing. The poultry engagement means are carried on the carriage means for being received in the body cavity of a bird so as to effect a positive driving force to the bird during operation of the carriage means. The loading means are for automatically seating the poultry engagement means into the body cavity of a bird as the poultry engagement means is carried and advanced by the carriage means. With such an arrangement, processing of poultry may be automatically continued without manual intervention as to birds received from processing equipment relatively upstream from the apparatus.

In the alternative, such improved automatic apparatus may further optionally include various cutting means for separating the bird hind quarters from the bird breast half, and/or for automatically halving the breast half of the bird or for automatically deboning the breast half of the bird.

In addition, embodiments of the present invention equally embrace methodology corresponding with such improved automatic apparatus.

Another present exemplary embodiment concerns a poultry processor for automatically receiving and handling dressed birds delivered thereto by a conventional overhead track having leg hooks by which dressed birds are hung in an inverted position and advanced at predetermined spacing intervals.

Such processor preferably comprises processor conveyor means, at least one loading cone, drag means, and at least one cutting means.

Such processor conveyor means is for establishing a processing flow through the processor and for advancing poultry along such flow from a poultry loading position thereof to at least one poultry cutting position thereof (when, and if, poultry cutting is involved in the embodiment). The at least one loading cone is carried on and advanced by such processor conveyor means so that the cone is inserted into the body cavity of an inverted dressed bird delivered by the overhead track into proximity of the loading position relative the processor conveyor means.

The above-referenced drag means are adjacent the loading position, and are operative for temporarily engaging the legs of an inverted dressed bird during insertion of the loading cone into the body cavity thereof. With such an arrangement, the loading cone becomes fully seated in such bird body cavity as the cone is advanced through the loading position by the processor conveyor means.

The foregoing processor also preferably includes at least one cutting means situated along the processing flow adjacent the poultry cutting position downstream from the poultry loading position. Such cutting means are operative for separating the bird hind quarters from the bird breast half. Thereafter, such hind quarters are advanced by the overhead track for further processing, while the breast half is advanced by the loading cone for further processing.

Again, further embodiments of the present invention equally involve methodology in correspondence with such improved poultry processor.

Those of ordinary skill in the art will better appreciate the features and aspects of such embodiments, methods, and others, upon review of the remainder of the specification.

BRIEF DESCRIPTION OF THE DRAWINGS

A full and enabling disclosure of the present invention, including the best mode thereof, directed to one or ordinary skill in the art, is set forth in the remainder of the specification, which makes reference to the appended FIGURES, in which:

FIG. 7 is an enlarged, side plan view of a portion of an alternate embodiment in accordance with the subject invention, illustrating various cutting means thereof associated with an upper side of the illustrated conveyor;

Figure 1:
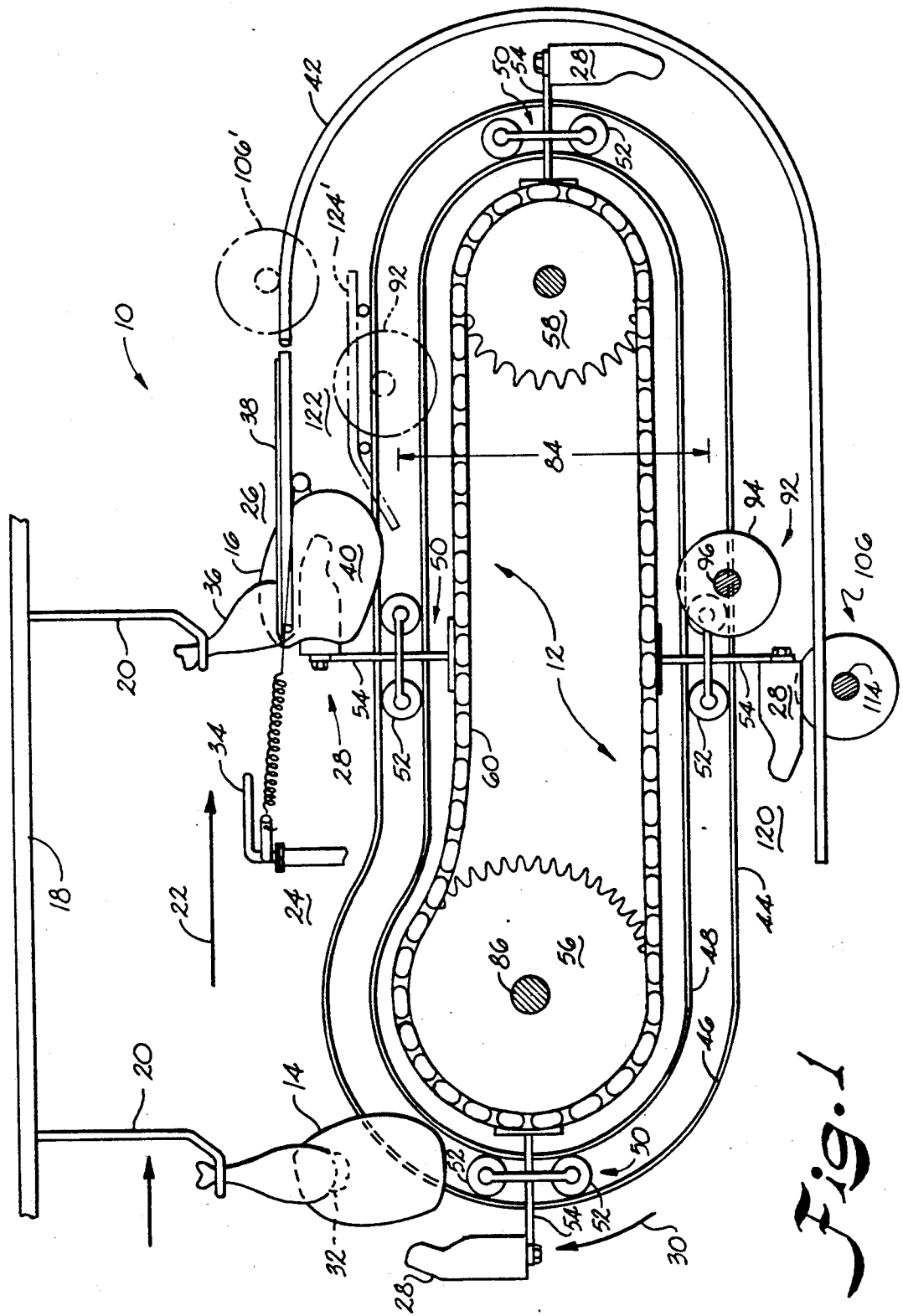
FIG. 1 is a side plan view (in partial cross section) of an exemplary embodiment of the present invention illustrating use thereof with an exemplary conventional overhead track.

Repeat use of reference characters throughout the present specification and appended drawings is intended to represent same or analogous features, elements, or steps of the invention.

DETAILED DESCRIPTION OF THE PREFERRED EMBODIMENTS

Figure 9:
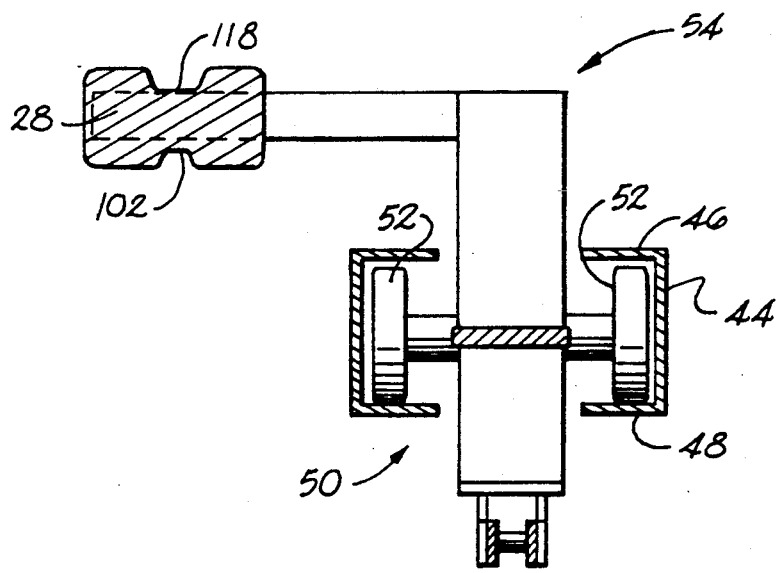
FIG. 9 is a cross-sectional view of the embodiment of, and similar to, the illustration of FIG. 8, but showing in isolation certain carriage and loading cone features of the subject invention.
Figure 8:
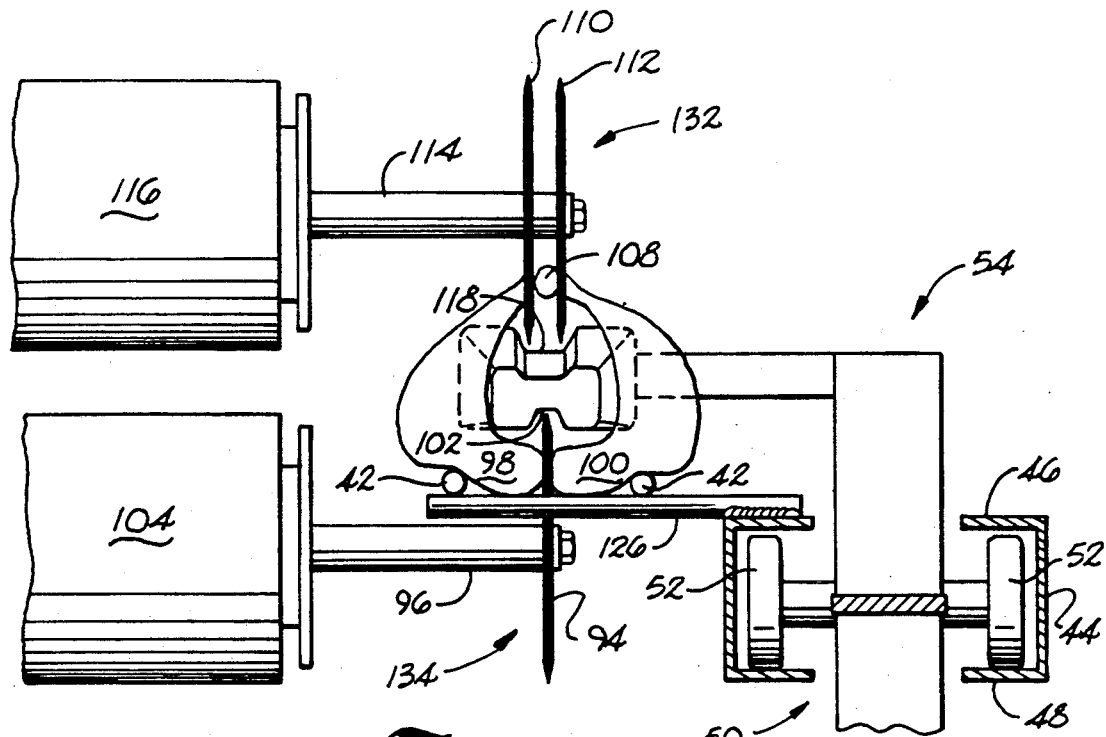
FIG. 8 is a cross-sectional view similar to that of FIG. 6, but shown for the alternate embodiment of FIG. 7 as indicated by the sectional line 8—8 therein.

The present invention may include various specific embodiments within the broader context thereof, and the following is a detailed description of exemplary such embodiments. In general, FIGS. 1 through 6 relate to a first such embodiment (representing both apparatus and corresponding methodology) while FIGS. 7 through 9 are more specifically concerned with one exemplary alternate embodiment.

FIG. 1 represents an exemplary automatic poultry processing apparatus or poultry processor 10 in accordance with this invention. Such processor has a carriage means or processor conveyor means (generally 12) for advancing poultry such as chickens 14 and 16 through apparatus 10 for processing. Those of ordinary skill in the subject art will appreciate that various cabinets, covers, saw shields, power cords, and the like are omitted from the present drawings so as to illustrate with greater clarity the internal workings of the subject invention. Such cabinetry and the like form no particular aspects of the subject invention and may be included as desired in various embodiments.

The subject embodiment is particularly useful for automatically receiving and handling dressed birds such as 14 and 16 delivered to the processor 10 by a conventional overhead track 18 (shown in partial) having leg hooks 20 by which dressed birds are hung in an inverted position and advanced at predetermined spacing intervals. For example, such intervals may be one foot or the like in many embodiments.

Processor conveyor means or carriage means 12 establishes a processing flow through the processor, generally in the direction of arrow 22. Conveyor means 12 also advances the poultry along such flow 22, generally from a poultry loading position 24 thereof to a subsequent at least one poultry cutting position 26 thereof (when poultry cutting is involved in the embodiment of the invention).

Poultry processor 10 further includes poultry engagement means (generally 28) which are carried on the carriage means or processor conveyor means. Such poultry engagement means are adapted for being received in the body cavity of a bird so as to effect a positive driving force thereto during operation of the carriage means. Conveyor means 12 advances in a continuous loop in the direction of arrow 30 so that poultry engagement means or loading cone 28 is directed into the body cavity 32 of a bird as shown in connection with bird 16 in present FIG. 1. Thereafter, continued movement or advancement of carriage means 12 and poultry engagement means 28 serves to positively drive the breast half of bird 16.

The subject invention preferably further includes loading means or drag means (generally 34) adjacent loading position 24 for helping to automatically seat the poultry engagement means or loading cone 28 into the body cavity of a bird as such cone 28 is carried and advanced by carriage means 12. With such an arrangement, processing of poultry may be automatically continued from overhead track 18 without manual intervention as to birds received from processing equipment relatively upstream from the apparatus (i.e., located in the direction opposite that of arrow 22).

More specifically, the drag means 34 are operative for temporarily engaging the legs 36 of an inverted dressed bird during insertion of a loading cone into its body cavity so that the loading cone becomes fully seated in such cavity as it is advanced through loading position 24 by processor conveyor means 12.

While the foregoing description provides a useful apparatus and corresponding methodology, various embodiments of this invention may also optionally involve one or more cutting means situated along the processing flow. For example, the embodiment of FIG. 1 illustrates one such at least one cutting means (generally 38) situated along the processing flow 22 adjacent the poultry cutting position 26 downstream from the poultry loading position 24. Such cutting means are operative for separating the bird hind quarters or legs 36 from the bird breast half 40. Thereafter, the hind quarters are further advanced by the overhead track 18 through continued engagement of the bird legs 36 with hooks 20. Meanwhile, the breast half 40 may be further advanced by loading cone 28 for subsequent processing. In conjunction with such advancement, various guide rail means 42 may be provided situated relatively adjacent at least a portion of conveyor means 12 for maintaining the bird breast half on the respective loading cone 28 associated therewith as it is driven and advanced by such cone for further processing.

Figure 2:
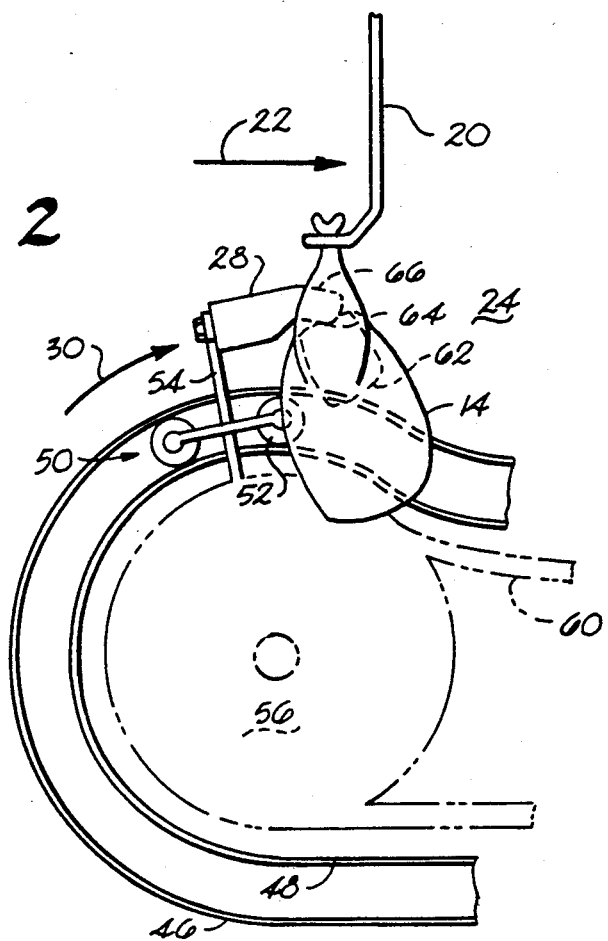
FIG. 2 is an enlarged, partial plan view of the embodiment of FIG. 1, particularly illustrating present apparatus and methodology as to insertion of a loading cone into the body cavity of a bird.
Figure 3:
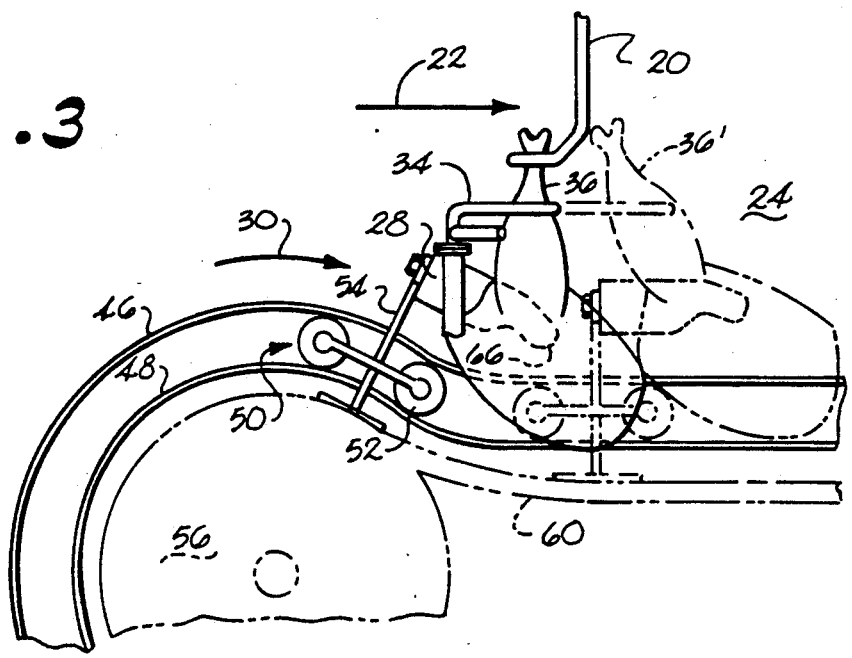
FIG. 3 is a view similar to that of FIG. 2, showing subsequent steps and operations involved with fully seating a loading cone or mandrel into the body cavity of a bird, in accordance with the present invention.
Figure 4:
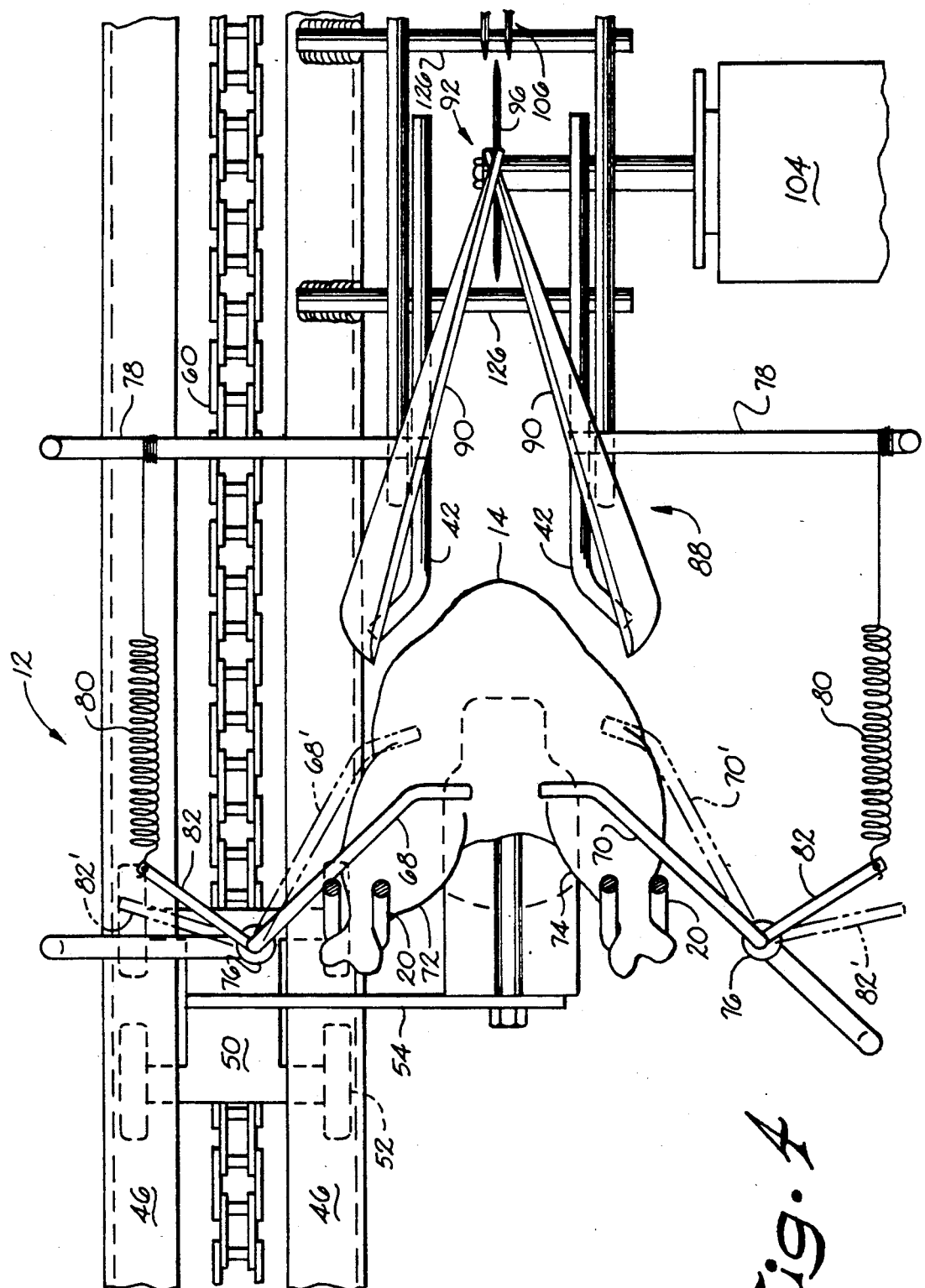
FIG. 4 is an enlarged top plan view of the FIG. 1 embodiment, illustrating loading means and various cutting means.

With more specific reference to processor conveyor means or carriage means 12, reference is presently made collectively to FIGS. 1 through 4. As noted above, FIGS. 2 and 3 comprise enlarged side plan views of the loading area or position 24 of the processing flow in accordance with the present invention, while FIG. 4 is an enlarged top plan view more specifically illustrating such operations and features and others subsequent to the loading operation.

First, with reference to the carriage means or processor conveyor means 12, it will be apparent to those of ordinary skill in the art from the illustrations herewith in the subject FIGURES that such means comprises an endless loop conveyor arrangement 44, which is intended to operate in the direction of arrow 30 so as to establish processing flow 22. Such endless loop arrangement includes an endless loop track comprising opposing members 46 and 48. Such tracks or rails serve to capture therein a carriage assembly 50 which as illustrated may include various wheels 52 for movement over the track.

As particularly illustrated by FIG. 1, poultry engagement means in accordance with the present invention may include a plurality of such loading cones 28, one each respectively mounted on respective support elements 54 of each respective carriage assembly 50. Respective support elements 54 are directed outwardly from the endless loop tracks 46 and 48 so as to be driven thereabout directed outside of such loop track. The location of the loading cones relative carriage means 12 is also preferably established at predetermined spacing intervals corresponding with the interval between adjacent hooks 20 on track 18. With such an arrangement, appropriate timing for driving of gears 56 and 58 and their corresponding drive chain 60 or equivalent means results in synchronized operations such that an inverted bird and a loading cone to be associated therewith are brought at the same time into the vicinity of loading position 24.

FIGS. 2 and 3 more particularly illustrate operations and methodology in accordance with the subject invention as exemplary inverted bird 14 and loading cone 28 are brought simultaneously into the vicinity of loading position 24.

As understood by those of ordinary skill in the art, a dressed bird 14 has been eviscerated and fully cleaned so that a body cavity 62 (shown in dotted line) is formed and has an entrance 64 thereto. With the present invention, it is intended that loading cone 28 becomes fully seated in such cavity 62, commencing with introduction of the tip or forward edge 66 of such loading cone into the entrance 64 of cavity 62. With present reference also to the overhead view of FIG. 4, it may be understood that carriage means 12 is positioned relative overhead track 18 so that bird 14 hangs in an inverted position lateral to carriage assembly 50, tracks 46 and 48, chain drive 60, and other necessary drive components. Additional details of such drive components are not illustrated since those of ordinary skill in the art are well acquainted with drive chains, belts, gears, motors, and the like, including the electronic speed controls and/or mechanical couplings which may be used for synchronizing the speed of one drive conveyor to another (in this instance, the speed of carriage means 12 relative conventional overhead track 18).

As illustrated in the FIGURES, drag means 34 are situated relative loading position 24 so as to initially engage the legs 36 of an inverted dressed bird during or about the time of insertion of the loading cone 28 into the bird body cavity. Preferably, such drag means comprise at least one drag element or other resiliently mounted element for temporarily impeding movement of the bird as loading cone 28 is seated, whereby such cone becomes fully seated into the bird body cavity. Since such drag elements are preferably resiliently mounted, ultimately the driving force exerted by loading cone 28 (as well as the overhead hooks 20) pulls the bird passed the leg drag element(s), which then resiliently returns to its original position for engagement with the legs of a subsequently presented bird. However, such relatively brief engagement greatly furthers objects of the present invention by helping to ensure full seating of the loading cone into the bird body cavity, which is an important aspect of being able to automatically load (i.e., receive and handle) birds from a prior processing station, in accordance with the subject invention.

FIG. 4 illustrates more particularly a preferred embodiment wherein the drag means 34 comprise a pair of spring biased pivot mounted engagement arms 68 and 70. Such arms are positioned as shown so as to respectively engage the legs 72 and 74 of an inverted bird 14 as loading cone 28 is directed into the body cavity thereof. A pivot mounting 76 of each such arm is preferably mounted on the framework of apparatus 10, as are the base support elements 78 for respective springs 80 by which arms 68 and 70 are ultimately biased. Such springs 80 are in fact connected through lever arms 82 to their respective engagement arms, and take on positions 82′ (shown in dotted line in FIG. 4) as the engagement arms begin to pivot out of the way of bird legs passing thereby.

Initially, the spring biasing offers resistance to (i.e., impedes passage of) the bird legs 72 and 74, which enables full seating of loading cone 28. Thereafter, such spring biasing enables the engagement arms 68 and 70 to pivot into the direction of dotted line representations 68′ and 70′ thereof (see FIG. 4). As they continue in such direction, the engagement arms are adequately pivoted so as to permit the bird legs to pass thereby, after which the spring biasing returns the engagement arms to their initial (solid line) positions for engaging the legs of a subsequent bird during cone loading thereof. As represented in FIG. 4, such bird may then be driven towards various cutting means, if desired.

Referencing again FIGS. 2 and 3, additional features of the subject invention are illustrated which further enhance full seating of cone or mandrel 28 into a bird body cavity. First, it may be readily observed from the various FIGURES that such loading cone or mandrel 28 preferably has a predetermined shape which is substantially matched with the interior space formed by a bird body cavity 62. Second, it may be readily observed from the FIGURES (including, for example, FIG. 1) that the processor conveyor means 12 has a predetermined curvature in or near the vicinity of loading position 24 and loading means 34 which manipulates the travel path of each cone or mandrel 28 in such vicinity for facilitating its insertion into the bird body cavity.

As more particularly illustrated, such predetermined curvature in fact preferably comprises a double curvature such that the carriage assembly 50 travels over a relatively larger outside diameter and then onto a relatively straight travel area. Such results with the leading edge 66 of a corresponding loading cone 28 being first directed relatively upwardly (i.e., towards hook 20) for entry through opening 64 into the body cavity 62 of an inverted bird hanging from overhead track 18, which is substantially the position thereof illustrated in present FIG. 2. Subsequently, the double curvature causes the end 66 of cone 28 to be drawn downwardly (i.e., generally away from hooks 20) and relatively accelerated forwardly (i.e., in the direction of arrow 22) so as to improve automatic seating thereof into the respective bird body cavity. Such manipulation of cone 28 is explained as follows.

Looking at FIGS. 1 through 3 it may be observed that the diameter of gear or drive wheel 56 (which in given embodiments may comprise an idler wheel rather than a driven wheel) is relatively larger than the diameter of gear 58 or the distance 84 between upper and lower sections of track elements 48 and 46 in the relatively straight travel areas thereof. As alluded to above, carriage assembly 50 is driven at a constant speed through tracks 48 and 46 and preferably in synchronism with the forward travel speed of overhead track 18. However, cone assembly 28 is mounted on support member 54 and thus extends further out on a radius from the center 86 of gear wheel 56 than carriage assembly 50 so extends. The net result is that the translational speed of cone 28 is greater than that of carriage assembly 50 as such carriage assembly 50 goes around the diameter of gear wheel 56.

In addition, the travel path established by apparatus and methodology of the present invention causes the forward edge or tip 66 of cone 28 to be projected outwardly in the position it occupies as shown in FIG. 2. As movement continues into the position illustrated first in solid line and then in dotted line in FIG. 3, it may be observed that the conveyor is undergoing a double curvature as carriage assembly 50 completes its travel about the radius of gear wheel 56. As it completes such travel, forward edge 66 is brought downwardly through opening 64 into cavity 62.

Another beneficial effect which occurs is that cone 28 is subsequently accelerated forwardly (i.e., in the direction of arrow 22). While the translational speed of cone 28 was previously increased relative to that of carriage assembly 50 (as described above), such relationship becomes reversed as such apparatus moves from the solid line position thereof illustrated in FIG. 3 to the dotted line position thereof illustrated in FIG. 3. In fact, the curvature which is being followed is shifted from the radius of gear wheel 56 to a pivot point on the opposite side (i.e., outside) of tracks 46 and 48. This means that carriage assembly 50 reaches a higher translational speed than cone 28 during such time, because cone 28 is actually closer to the center of such radius of curvature than is carriage assembly 50. As the straight travel path area is reached in the processing flow (i.e., the dotted line position shown for carriage assembly 50 in FIG. 3), loading cone 28 is in fact accelerated forwardly (i.e., in the direction of arrow 22) so that its translational speed "catches up" with that of carriage assembly 50. In other words, both elements (carriage assembly 50 and loading cone 28) obtain the same translational speed once the relatively straight travel path area is reached, and such requires loading cone 28 to be relatively accelerated since its just prior translational speed was lower than that of carriage assembly 50. The foregoing features serve to further facilitate full seating of loading cone 28 into the body cavity, whether used in conjunction with or separate from the drag means described above.

With reference to FIGS. 1 and 4 through 6, various cutting means in accordance with this embodiment are described. While certain embodiments do not necessarily involve cutting means, one preferred embodiment of apparatus 10 and corresponding methodology thereof further includes a first cutting means 38, situated relatively downstream from loading means 34 along carriage means 12, and operative for separating the bird hind quarters from the bird breast half. As illustrated in FIG. 4, such first cutting means preferably comprises a knife station 88 which separates the bird as it is advanced jointly by the loading cone 28 (i.e., conveyor) and the overhead track 18 with hooks 20. More specifically, such at least one cutting means preferably comprises a V-shaped knife arrangement 90 into which the bird is positively drawn by both the overhead track 18 and its respective loading cone 28. Such knife arrangement is preferably situated on an upper side of the endless loop track as illustrated in present FIGS. 1 and 4, so that the separated hind quarters of the inverted bird are free to be conveyed away by such overhead track while the breast half of the bird remains positively driven by its respective loading cone 28 associated therewith.

If desired, still further cutting means may be operated in accordance with the present invention, preferably downstream from the first cutting means 38 described above. For example, second cutting means 92 may be provided for automatically halving the breast half of the bird. Such an arrangement preferably comprises a saw blade 94 which is rotatably driven about an axis 96 so as to literally cut in half a breast segment presented thereto. With a more specific reference to FIG. 6, such saw blade separates the breast into halves 98 and 100 while being received in a channel 102 of the corresponding cone or mandrel 28. An electric motor or the like 104 may be used to drive second cutting means 92.

A still further third cutting means 106 may be provided also relatively downstream from the first cutting means, for automatically deboning the breast half of the bird. Such deboning involves removal of the backbone 108 from the breast. This may be accomplished by the use of a pair of 10 saw blades 110 and 112, both of which may be mounted on a drive shaft 114 which is driven by an electric motor or the like 116, similar to the drive arrangement 104 for second cutting means 92. Additional details of such drive arrangements are well understood by those of ordinary skill in the art.

As further represented in the present FIGURES, mandrel 28 has a further appropriate channel 118 preferably formed therein to permit use of saw blades 110 and 112 without damage to such cone 28. Channels 102 and 118 are also represented in dotted line in present FIG. 5.

Use of second cutting means 92 and third cutting means 106 are optional and may be variously practiced. For example, together such may be considered to comprise a saw blade station downstream from the knife station 88 and operative for automatically halving and deboning the bird breast half as it is advanced by the mandrel 28 on which the bird is received. As such, the precise location and configuration of such features may be varied. FIG. 1 illustrates in solid line positions of cutting means 92 and 106 situated on a relatively lower side 120 of the endless loop track 44. An alternate situs on a relatively upper side 122 of such track is represented in FIG. 1 by the dotted line arrangements of means 92' and 106'. Other features, when used, such as guide or shield surface 124' may be correspondingly moved or modified as cutting means locations are moved.

The solid line illustration of the top plan view of FIG. 4 illustrates positions of cutting means 92 and 106 as they might appear if used on an upper side of the endless loop track or on a lower side of the endless loop track (with the relative processing flow position of means 92 and 106 reversed from that as illustrated in solid line in FIG. 1).

Figure 5:
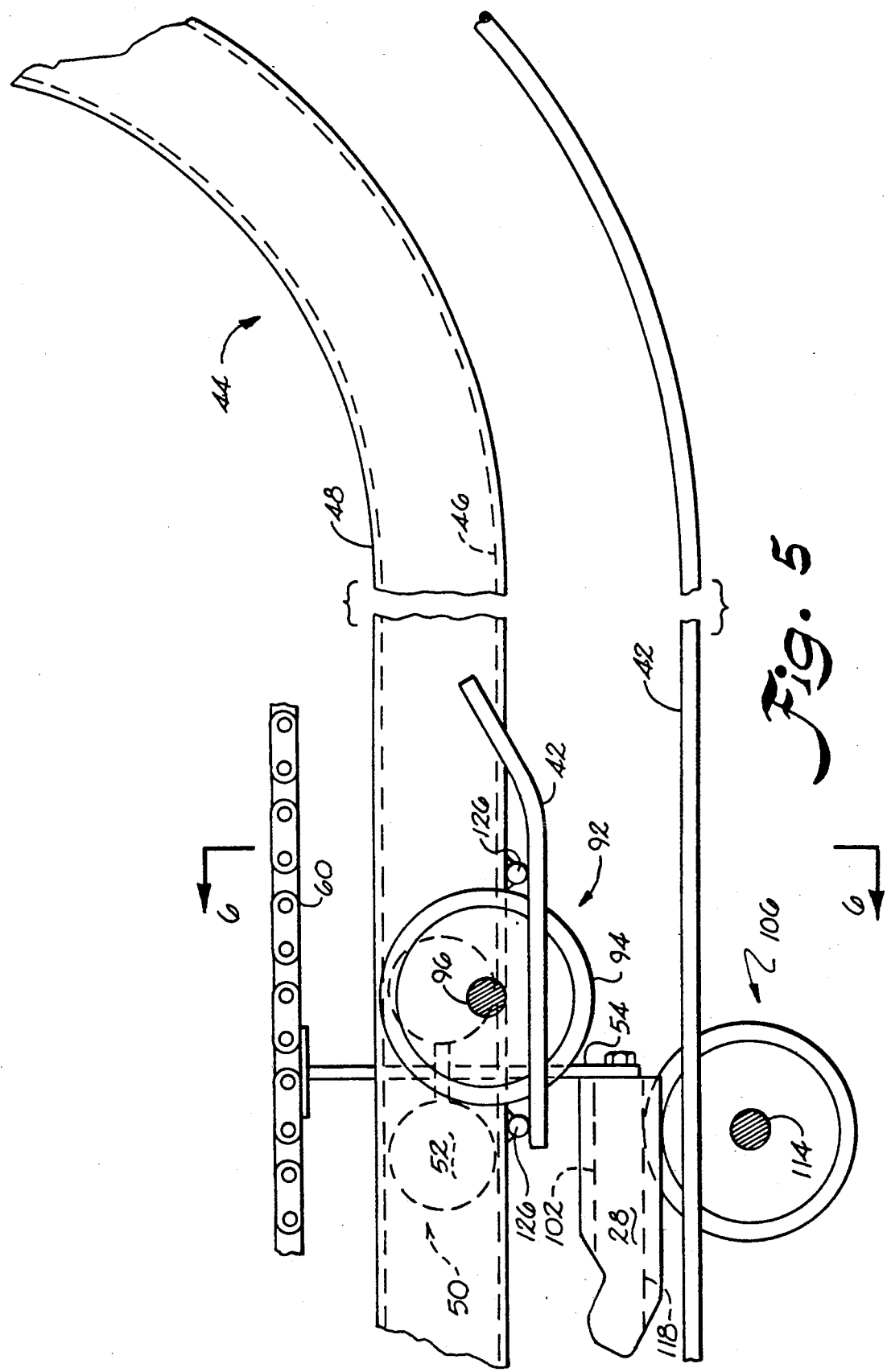
FIG. 5 is an enlarged side plan view of a portion of the FIG. 1 embodiment, particularly illustrating optional cutting means associated therewith.
Figure 6:
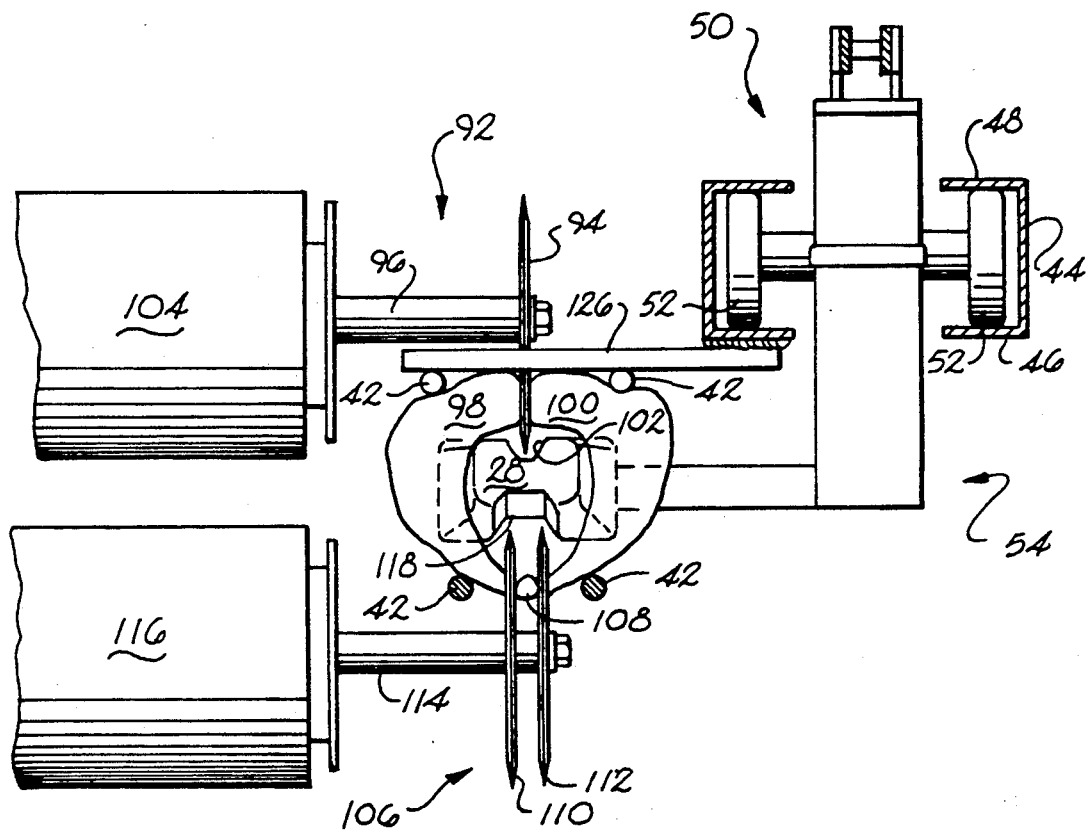
FIG. 6 is a cross-sectional view of a portion of the FIG. 5 illustration, as indicated therein by the sectional line 6—6.

Still further, FIG. 5 illustrates an enlarged side view of the solid line FIG. 1 embodiment of cutting means 92 and 106. FIG. 6 illustrates a sectional view of such features, taken along the sectional line 6—6 in FIG. 5. Such FIG. 6 again well illustrates the lateral relationship of the bird relative carriage assembly features 50 and endless loop track 44, which permits an uninterrupted processing flow around apparatus 10. Additional support elements 126 as might be used in association with guard rail means 42 and the like are largely diagrammatically represented in present FIGS. 5 and 6, but may be varied in accordance with the broader teachings of the present invention to satisfy corresponding functions in various modified embodiments used by those of ordinary skill in the art.

FIGS. 7 through 9 illustrate in solid line certain alternate embodiment aspects of the present invention, particularly relating to the provision of other cutting means for automatically halving and/or deboning a bird breast half positively driven therethrough by the respective loading cone associated with such bird. With reference to FIG. 7, an enlarged side plan view of an alternate embodiment primarily illustrates in greater detail the features presented by cutting means 92' and cutting means 106' of FIG. 1. Such embodiment also more closely illustrates the separation of hind quarters 128 of a bird and preferred manner in which the hooks 20 of an endless track 18 (not shown) are used to upwardly direct such hind quarters 128 in the direction of arrow 130 so as to avoid contact of such hind quarters with the blades of cutting means 132. Such cutting means 132 substantially correspond with the description of cutting means 106', and solid line cutting means 134 likewise substantially correspond with the description of cutting means 92'. The bird breast half 136 continues to be driven by cone 28 associated therewith for subsequent engagement with cutting means 132 and 134, as described above with reference to cutting means 92 and 106.

FIG. 8 is a cross-sectional view of the illustration of FIG. 7, taken along the sectional line 8—8 illustrated therein, while FIG. 9 illustrates substantially the same subject matter, but with the bird and cutting means illustrations removed for greater clarity with respect to the loading cone, carriage assembly, and conveyor features of the subject invention. Operation and function of such features and corresponding methodology are virtually identical to their corresponding elements as described above with the previous embodiment. As will be noted, however, the position of many such elements are simply reversed due to their location being on the relative upper side 122 of track 44 as opposed to being on the relative lower side 120 thereof. Hence, repeat use of reference characters is utilized in lieu of a complete redescription thereof.

Those of ordinary skill in the art will appreciate that additional modifications and variations may be made, particularly to accommodate given embodiments and/or needs of particular installations. Also, other features may be varied within the broader teachings of the subject invention. For example, the relatively solid loading cone or mandrel 28 may be replaced by another element comprising a longitudinally split loading cone with spring biasing therebetween. Then push rods or the like may be utilized with caming mechanisms in operation with the carriage track to "squeeze" together the mandrel halves as the mandrel is being introduced into the body cavity of a bird, and with the central spring biasing in the mandrel being subsequently used to push the mandrel halves outwardly against the bird cavity. Such an arrangement would even further secure a locked seating of the mandrel, even though the embodiments described above are fully adequate for providing a positive drive relationship between such mandrel or cone and its corresponding bird.

Also, as referenced above, various cabinet walls, shields, guides, or the like may be added as desired or as dictated by hygiene or safety considerations. For example, conveyor drives or the like may be enclosed to prevent the escape of grease or similar materials onto the food (i.e., poultry) being processed.

Still further, other elements such as product exit chutes, unloading planes, or the like, as well as receptacles for such exiting products, may be provided in satisfaction of particular installations or usages of the present invention. Still further, various equivalents may be substituted for the exemplary features illustrated herewith. For example, in place of the resiliently mounted and pivotable leg drags, hydraulic clamps are similar mechanisms with associated timing features may be used to temporarily engage the legs of a bird being presented to the apparatus. Similarly, other functional equivalents may be practiced for achieving the desired timing results with respect to birds being presented on a conventional overhead track. Also, the invention may be modified to accommodate automatic presentation of birds from other types of devices than the conventional overhead track described above, so long as the body cavity of the bird is presented in such fashion as to be engaged with a positive drive relationship as described above.

It should be further understood by those of ordinary skill in the art that the foregoing presently preferred embodiments are exemplary only, and that the attendant description thereof is likewise by way of words of example rather than words of limitation, and their use do not preclude inclusion of such modifications, variations, and/or additions to the present invention as would be readily apparent to one of ordinary skill in the art, the scope of the present invention being set forth in the appended claims.

What is claimed is:

1. An automatic poultry processing apparatus, comprising:

carriage means for advancing poultry through said apparatus for processing;

poultry engagement means, carried on said carriage means, for being received in the body cavity of a bird so as to effect a positive driving force thereto during operation of said carriage means; and loading means for automatically seating said poultry engagement means into the body cavity of a bird as said poultry engagement means is carried and advanced by said carriage means, so that processing of poultry may be automatically continued without manual intervention as to birds received from processing equipment relatively upstream from said apparatus.

2. An apparatus as in claim 1, further comprising first cutting means, relatively downstream from said loading means along said carriage means, for separating the bird hind quarters from the bird breast half, so that such separated pieces may undergo further processing.

3. An apparatus as in claim 2, further comprising second cutting means, relatively downstream from said first cutting means, for automatically halving said breast half of the bird.

4. An apparatus as in claim 3, further comprising third cutting means, relatively downstream from said first cutting means, for automatically deboning said breast half of the bird.

5. An apparatus as in claim 1, wherein:

said carriage means comprises an endless loop conveyor; and said poultry engagement means comprises a plurality of mandrels associated with said conveyor at predetermined spaced intervals therealong, each of said mandrels having a predetermined shape for being received in a bird body cavity.

6. An apparatus as in claim 5, wherein said conveyor has a predetermined curvature in the vicinity of said loading means which manipulates the travel path of each mandrel in such vicinity for facilitating insertion of such mandrel into the body cavity of a bird.

7. An apparatus as in claim 1, wherein said loading means includes at least one drag element for temporarily impeding movement of a bird as said poultry engagement means is seated so as to fully seat said poultry engagement means and thereafter permit the bird to be positively advanced by said poultry engagement means and said carriage means.

8. An apparatus as in claim 1, wherein said loading means includes a pair of bird leg engagement members, each of which are respectively resiliently mounted and positioned so as to temporarily retard advancement of a bird while said poultry engagement means is seated in the body cavity thereof, said resiliently mounted members subsequently being driven out of a temporary blocking position by advancement of said poultry engagement means and carriage means and then returning to such temporary blocking position.

9. An apparatus as in claim 1, wherein:

said carriage means comprises an endless loop conveyor having a loading area thereof situated adjacent the flow of a conventional overhead track along which dressed birds are hung by the legs in an inverted position and advanced at predetermined spaced intervals;

said poultry engagement means comprises a plurality of bird cavity mandrels mounted on said conveyor at said predetermined spaced intervals, and consecutively and respectively brought into contact thereby with the body cavities of birds being advanced on the conventional overhead track; and said loading means comprises a pair of bird leg drags, which are respectively resiliently mounted in relation to said conveyor and the conventional overhead track so as to resiliently engage the legs of a bird as a mandrel is being introduced into the body cavity thereof, so that such mandrel becomes fully seated therein and drives such bird passed said leg drags and further downstream for processing.

10. An apparatus as in claim 9, further including:

a knife station downstream from said loading means for cutting a bird so as to separate its breast half from its hind quarters as such bird is advanced jointly by said conveyor and the overhead track; and a saw blade station downstream from said knife station for automatically halving and deboning the bird breast half as it is advanced by the mandrel on which the bird is received.

11. A poultry processor for automatically receiving and handling dressed birds delivered thereto by a conventional overhead track having leg hooks by which dressed birds are hung in an inverted position and advanced at predetermined spacing intervals, said processor comprising:

processor conveyor means for establishing a processing flow through said processor and for advancing poultry along said flow from a poultry loading position thereof to at least one poultry cutting position thereof;

at least one loading cone carried on and advanced by said processor conveyor means such that said cone is inserted into the body cavity of an inverted dressed bird delivered by the overhead track into proximity of said loading position relative said processor conveyor means;

drag means, adjacent said loading position, for temporarily engaging the legs of an inverted dressed bird during insertion of said loading cone into the body cavity thereof so that said loading cone becomes fully seated in such cavity as said cone is advanced through said loading position by said processor conveyor means; and at least one cutting means, situated along said processing flow adjacent said poultry cutting position downstream from said poultry loading position, for separating the bird hind quarters from the bird breast half, with such hind quarters thereafter being advanced by the overhead track for further processing, and with such breast half thereafter being advanced by said loading cone for further processing.

12. A poultry processor as in claim 11, wherein:

said processor conveyor means comprises an endless loop track with a plurality of carriage assemblies carried thereabout at spaced intervals matched with said predetermined spacing intervals of the overhead track and timed in relation to such overhead track, each of said carriage assemblies including a respective support element directed outwardly from said endless loop track so as to be driven thereabout outside said loop track; and a plurality of loading cones, one each respectively mounted on the respective support element of each respective carriage assembly, so as to be consecutively inserted into the body cavities of birds being delivered by the overhead track into proximity of said loading position.

13. A poultry processor as in claim 12, further wherein said drag means comprises a pair of spring biased, pivot mounted engagement arms, positioned so as to respectively engage the legs of an inverted bird as a loading cone is directed into the body cavity of such bird, so that such spring biasing initially offers resistance to enable full seating of such loading cone and thereafter enables said engagement arms to pivot as the bird legs pass thereby, after which such spring biasing returns said engagement arms to their initial position for engaging the legs of a subsequent bird during cone loading thereof.

14. A poultry processor as in claim 13, wherein said endless loop track includes a predetermined curvature adjacent said poultry loading position so that each loading cone is manipulated along a predetermined path to facilitate seating thereof in a bird body cavity.

15. A poultry processor as in claim 14, wherein said predetermined curvature comprises a double curvature such that said carriage assembly travels over a relatively larger outside diameter and then onto a relatively straight travel area, so that a leading edge of a corresponding loading cone is first directed relatively upwardly for entry into the body cavity of an inverted bird hanging from the overhead track, and is then drawn downwardly and relatively accelerated forwardly so as to improve automatic seating thereof in the respective bird body cavity.

16. A poultry processor as in claim 12, wherein said at least one cutting means comprises a V-shaped knife arrangement into which the bird is positively drawn by both the overhead track and its respective loading cone, said knife arrangement being situated on an upper side of said endless loop track so that the hind quarters of the inverted bird are free to be conveyed away by the overhead track while the breast half of the bird remains positively driven by the respective loading cone associated therewith.

17. A poultry processor as in claim 16, further comprising guide rail means, situated relatively adjacent at least a portion of said endless loop track, for maintaining a bird breast half on the respective loading cone associated therewith as it is driven and advanced thereby for further processing.

18. A poultry processor as in claim 17, further comprising other cutting means, relatively downstream from said at least one cutting means, for selectively automatically halving and/or deboning a bird breast half positively driven therethrough by the respective loading cone associated with such bird; and wherein said guide rail means are situated along said endless loop track at least between said at least one cutting means and said other cutting means.

19. A poultry processor as in claim 18, wherein said other cutting means are situated on a relatively upper side of said endless loop track.

20. A poultry processor as in claim 18, wherein said other cutting means are situated on a relatively lower side of said endless loop track.

21. Process for an automatic poultry processing apparatus, comprising:

operating a carriage means for advancing poultry through said apparatus for processing;

providing poultry engagement means, carried on said carriage means, for being received in the body cavity of a bird so as to effect a positive driving force thereto during operation of said carriage means; and providing and operating loading means for automatically seating said poultry engagement means into the body cavity of a bird as said poultry engagement means is carried and advanced by said carriage means, so that processing of poultry may be automatically continued without manual intervention as to birds received from processing equipment relatively upstream from said apparatus.

22. A process as in claim 21, further comprising operating first cutting means, relatively downstream from said loading means along said carriage means, for separating the bird hind quarters from the bird breast half, so that such separated pieces may undergo further processing.

23. A process as in claim 22, further comprising operating second cutting means, relatively downstream from said first cutting means, for automatically halving said breast half of the bird.

24. A process as in claim 23, further comprising operating third cutting means, relatively downstream from said first cutting means, for automatically deboning said breast half of the bird.

25. A process as in claim 21, wherein:
said carriage means comprises an endless loop conveyor; and
providing said poultry engagement means includes providing a plurality of mandrels associated with said conveyor at predetermined spaced intervals therealong, each of said mandrels having a predetermined shape for being received in a bird body cavity.

26. A process as in claim 25, wherein said conveyor has a predetermined curvature in the vicinity of said loading means which manipulates the travel path of each mandrel in such vicinity for facilitating insertion of such mandrel into the body cavity of a bird.

27. A process as in claim 21, wherein providing and operating said loading means includes providing at least one drag element for temporarily impeding movement of a bird as said poultry engagement means is seated so as to fully seat said poultry engagement means and thereafter permitting the bird to be positively advanced by said poultry engagement means and said carriage means.

28. A process as in claim 21, wherein providing and operating said loading means includes providing a pair of bird leg engagement members, each of which are respectively resiliently mounted and positioned so as to temporarily retard advancement of a bird while said poultry engagement means is seated in the body cavity thereof, said resiliently mounted members subsequently being driven out of a temporary blocking position by advancement of said poultry engagement means and carriage means and then returning to such temporary blocking position.

29. A process as in claim 21, wherein:
said carriage means comprises an endless loop conveyor having a loading area thereof situated adjacent the flow of a conventional overhead track along which dressed birds are hung by the legs in an inverted position and advanced at predetermined spaced intervals;
providing said poultry engagement means includes providing a plurality of bird cavity mandrels mounted on said conveyor at said predetermined spaced intervals, and consecutively and respectively brought into contact thereby with the body cavities of birds being advanced on the conventional overhead track; and
providing and operating said loading means includes providing a pair of bird leg drags, which are respectively resiliently mounted in relation to said conveyor and the conventional overhead track so as to resiliently engage the legs of a bird as a mandrel is being introduced into the body cavity thereof, so that such mandrel becomes fully seated therein and drives such bird passed said leg drags and further downstream for processing.

30. A process as in claim 29, further including:
operating a knife station downstream from said loading means for cutting a bird so as to separate its breast half from its hind quarters as such bird is advanced jointly by said conveyor and the overhead track; and
operating a saw blade station downstream from said knife station for automatically halving and deboning the bird breast half as it is advanced by the mandrel on which the bird is received.

31. A method for automatically receiving and handling dressed birds delivered thereto by a conventional overhead track having leg hooks by which dressed birds are hung in an inverted position and advanced at predetermined spacing intervals, said method comprising:
establishing a processing flow with a conveyor for advancing poultry along said flow from a poultry loading position thereof to at least one poultry cutting position thereof;
providing at least one loading cone carried on and advanced by said conveyor such that said cone is inserted into the body cavity of an inverted dressed bird delivered by the overhead track into proximity of said loading position relative said conveyor;
adjacent said loading position, temporarily engaging the legs of an inverted dressed bird during insertion of said loading cone into the body cavity thereof so that said loading cone becomes fully seated in such cavity as said cone is advanced through said loading position by said conveyor; and
using cutting means, situated along said processing flow adjacent said poultry cutting position downstream from said poultry loading position, for separating the bird hind quarters from the bird breast half, and thereafter advancing such hind quarters by using the overhead track for further processing and advancing such breast half by using said loading cone for further processing.

32. A method as in claim 31, wherein:
said establishing includes providing an endless loop track with a plurality of carriage assemblies carried thereabout at spaced intervals matched with said predetermined spacing intervals of the overhead track and timed in relation to such overhead track, each of said carriage assemblies including a respective support element directed outwardly from said endless loop track so as to be driven thereabout outside said loop track; and
said providing at least one loading cone includes providing a plurality of loading cones, one each respectively mounted on the respective support element of each respective carriage assembly, so as to be consecutively inserted into the body cavities of birds being delivered by the overhead track into proximity of said loading position 33. A method as in claim 32, further wherein said temporarily engaging includes providing a pair of spring biased, pivot mounted engagement arms, positioned so as to respectively engage the legs of an inverted bird as a loading cone is directed into the body cavity of such bird, so that such spring biasing initially offers resistance to enable full seating of such loading cone and thereafter enables said engagement arms to pivot as the bird legs pass thereby, after which such spring biasing returns said engagement arms to their initial position for engaging the legs of a subsequent bird during cone loading thereof.

34. A method as in claim 33, further including providing said endless loop track with a predetermined curvature adjacent said poultry loading position so that each loading cone is manipulated along a predetermined path to facilitate seating thereof in a bird body cavity.

35. A method as in claim 34, wherein providing said predetermined curvature includes providing a double curvature such that said carriage assembly travels over a relatively larger outside diameter and then onto a relatively straight travel area, so that a leading edge of a corresponding loading cone is first directed relatively upwardly for entry into the body cavity of an inverted bird hanging from the overhead track, and is then drawn downwardly and relatively accelerated forwardly so as to improve automatic seating thereof in the respective bird body cavity.

36. A method as in claim 32, wherein said using cutting means includes providing a V-shaped knife arrangement into which the bird is positively drawn by both the overhead track and its respective loading cone, said knife arrangement being situated on an upper side of said endless loop track so that the hind quarters of the inverted bird are free to be conveyed away by the overhead track while the breast half of the bird remains positively driven by the respective loading cone associated therewith.

37. A method as in claim 36, further comprising providing guide rail means, situated relatively adjacent at least a portion of said endless loop track, for maintaining a bird breast half on the respective loading cone associated therewith as it is driven and advanced thereby for further processing.

38. A method as in claim 37, further comprising providing other cutting means, relatively downstream from said knife arrangement cutting means, for selectively automatically halving and/or deboning a bird breast half positively driven therethrough by the respective loading cone associated with such bird; and wherein providing said guide rail means includes situating same along said endless loop track at least between said knife arrangement cutting means and said other cutting means.

39. A method as in claim 38, wherein providing said other cutting means includes situating same on a relatively upper side of said endless loop track.

40. A method as in claim 38, wherein providing said other cutting means includes situating same on a relatively lower side of said endless loop track.

* * * * *